United States Patent Office 2,812,898
Patented Nov. 12, 1957

2,812,898

REVERSE ACTION ROTORS FOR USE IN A JET PROPULSION SYSTEM

Ernest H. Buell, Albany, N. Y.

Application February 25, 1954, Serial No. 412,534

7 Claims. (Cl. 230—116)

The present invention relates to jet propulsion. More particularly, the present invention relates to an aircraft jet engine in which reverse action rotors are employed to produce a stabilizing effect on the aircraft.

Since the development of high speed aircraft, wherein jet engines are utilized, maneuverability of the aircraft under operating conditions has been an ever-present problem. Due to the large centrifugal forces generated by the turbo compressor unit in the jet engine, a gyroscopic action results which prevents quick maneuvering at high speeds. Moreover, due to the large centrifugal forces and the gyroscopic or gyro action, the efficiency of the jet engine is decreased and the safe flying time of the engine in operation is materially reduced. Prior to the instant invention, little has been accomplished in solving the problem, although there have been some efforts made to combat the forces creating the gyro effect by utilizing contra-rotating shafts. These heretofore known jet engines using reversely operating shafts have not been successful in solving the problem since the contra-rotating elements have not been constructed such as to completely eliminate the forces resulting in the gyro action.

In the construction of the present invention, an independently operated turbine compressor rotor is assembled on a shaft and is enclosed by a second independently operated turbine compressor rotor. The rotors are of equal size and weight and rotate at the same speed, thereby neutralizing the gyro action which is encountered by a single rotor rotating in one direction. By eliminating the gyro action and reducing the centrifugal forces, the aircraft will be more quickly responsive to the pilot's control and will be more maneuverable at high speeds.

It is therefore an object of the present invention to provide a jet engine for use in aircraft which will render the aircraft more maneuverable at high speeds.

Another object of the present invention is to provide a jet engine for use in aircraft having reversely rotating rotors.

Still another object of the present invention is to provide a turbo compressor unit having reversely rotating rotors, one within the other, thereby eliminating any gyro effect and reducing the centrifugal forces present.

Still another object of the present invention is to provide supporting means for the reversely rotating shafts in the form of conveniently positioned bearings.

Still another object of the present invention is to provide an automatically controlled cooling system for the rotors, rotor shafts, and rotor shaft supporting structure.

Still another object of the present invention is to provide a lubricating system for the bearings, whereby all the bearings are lubricated, but a minimum of lubricating oil is utilized.

Other objects and the nature and advantages of the instant invention will be apparent from the following description taken in conjunction with the accompanying drawings, wherein:

Fig. 3 is a view taken along the line 3—3 of Fig. 1; and

Fig. 4 is a view taken along the line 4—4 of Fig. 1.

Generally, the present invention comprises a jet motor of the axial flow type having reversely rotating turbine rotors coupled to reversely rotating compressor rotors through coaxial shafts. A plurality of combustion chambers are positioned between the turbine and compressor rotors and are adapted to direct the combustion gases into the blades of the turbine rotors from whence the combustion gases are exhausted through a nozzle to thereby effect a direct reaction drive. The combustion gases are also adapted to drive the turbine rotors which, in turn, drive the compressor rotors through the coaxial shafts. The turbine and compressor rotors are formed in a similar manner and are arranged such that the inner rotor of each unit is completely enclosed by the outer rotor thereof. Furthermore, the outer rotor of each unit is formed in two sections, one section being integral with the corresponding section of the adjacent unit and the other section being formed as a separately cast element. In addition, a cooling system is provided for cooling the rotor shafts and supports and is automatically controlled in accordance with the operating conditions of the engine.

Figure 1:
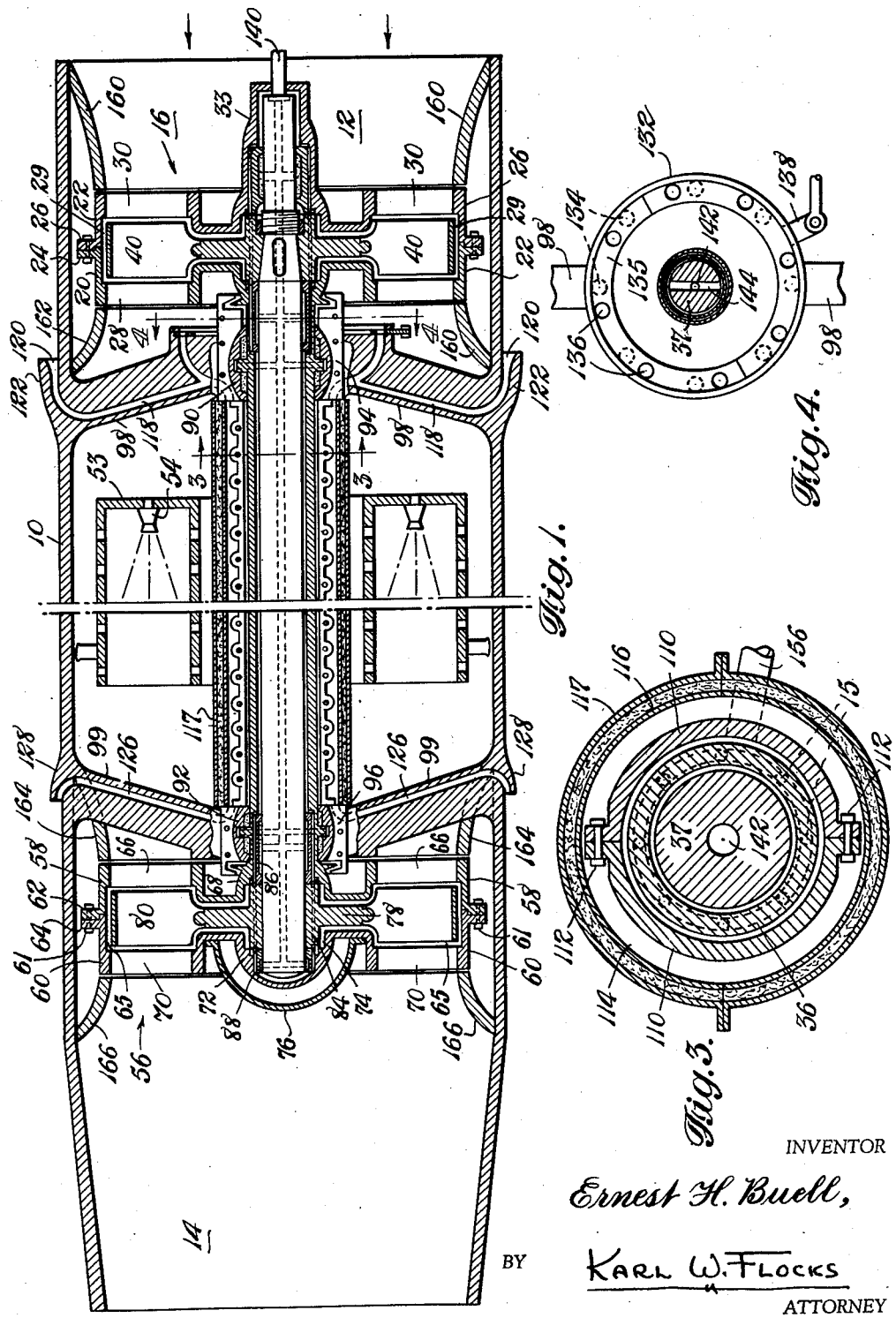
Fig. 1 is a vertical sectional view of the jet engine embodied in the present invention.
Figure 2:
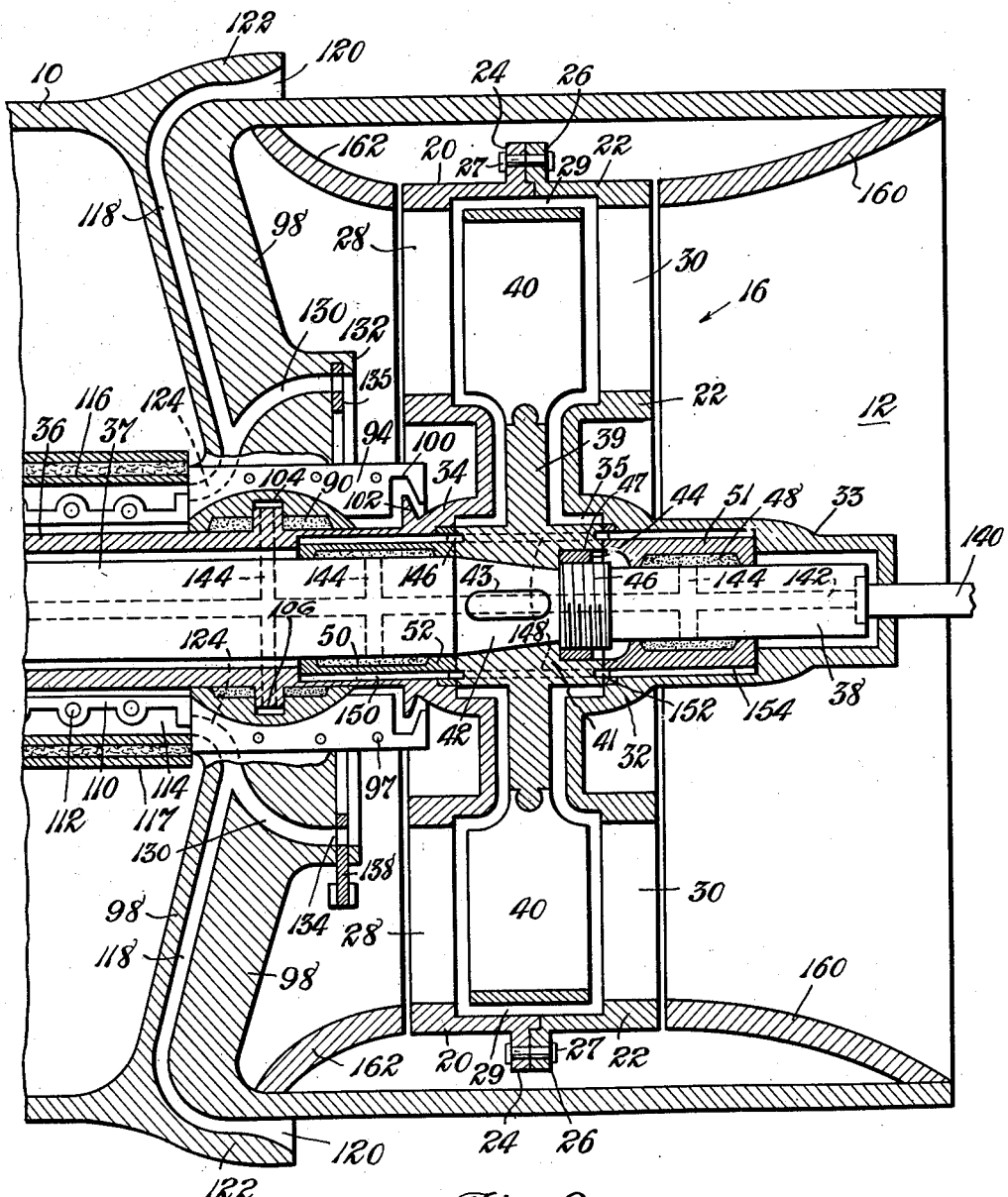
Fig. 2 is an enlarged view of a portion of the jet engine shown in Fig. 1 illustrating the compressor rotors, cooling system and lubricating system.

Referring now to the drawings, and particularly Fig. 1, the jet engine embodied in the present invention is illustrated and includes a casing 10 having an inlet 12 and a nozzle or outlet 14. Positioned adjacent the inlet 12 is a compressor unit of the axial flow type indicated generally at 16. The compressor unit 16 includes an inner rotor and an outer rotor, the outer rotor being formed in two individual sections 20 and 22. The outer compressor rotor sections 20, 22 are formed with annular flanges 24 and 26, respectively, which are secured together by body bolts 27. The rotor sections 20, 22 are thereby joined together as a unitary structure and define an annular recess 29 therebetween. Formed in the section 20 is an annular ring of blades 28, while the section 22 has formed therein a corresponding annular ring of blades 30. Referring to Fig. 2, an annular hub portion 32 which includes as an extension thereof a hollow outer shaft 33 is shown formed integral with the section 22 of the outer compressor rotor. The section 20 of the outer compressor rotor has a corresponding annular hub portion 34 formed integral therewith which defines with the hub portion 32 a chamber 35 for receiving an inner compressor rotor hub, as will be described hereinafter. The hub portion 34 has formed integral therewith a hollow outer shaft 36 which receives an inner rotor shaft 37. The shaft 37, as shown, has a reduced end 38 which extends into the hollow outer shaft 33. The outer rotor sections 20, 22 define therebetween the annular recess 29 in which is positioned an inner compressor rotor 39 having an annular ring of blades 40 secured thereto. The ring of blades 40 thereby form with the blade rings 28 and 30 an axial flow compressor for increasing the pressure of the air admitted through the inlet 12 and prior to being introduced into the combustion zone.

The inner rotor 39 is formed with a central hub 41 that is positioned in the chamber 35 defined by the hub portions 32 and 34, the hub 41 being secured to a tapered portion 42 of the inner shaft 37. The tapered portion 42 includes a keyway 43 that receives a corresponding key formed on the hub 41. The hub 41 is positioned on the tapered portion 42 of the inner shaft 37 and is secured thereto by a spanner nut 44 engaging a threaded portion 46 formed on the shaft 37, the spanner nut 44 fitting into a recess 47 formed in the hub 41.

In order to provide free rotation of the inner shaft 37 and reduced end 38 with respect to the outer shafts 36 and 33, bearings 48 and 50 are positioned in the shafts 33 and 36, respectively. The bearings 48 and 50 engage the inner shaft 37 and reduced end 38, respectively, and are disposed in thrust portions 51 and 52 which abut against the outer faces of the inner rotor hub 41 and thereby prevent lateral movement thereof.

Located downstream from the compressor unit 16 and suitably secured to the casing 10, as shown in Fig. 1, are a plurality of combustion chambers 53 that form an annular combustion ring, as is well known in the art. The combustion chambers 53 are adapted to receive a fuel therein through the fuel jets 54 and thereby provide the necessary mixing of the fuel with the compressed air within the interior thereof. The resulting combustion products are then exhausted downstream to a turbine unit which is generally indicated at 56.

The turbine unit 56 comprises an outer turbine rotor similar in construction to the outer compressor rotor, the outer turbine rotor including outer turbine rotor sections 58 and 60, which are secured for rotation together by body bolts 61 engaging annular flanges 62 and 64. The turbine rotor sections 58, 60 are thereby joined together as a unitary structure and define therebetween an annular recess 65. The outer turbine rotor section 58 further includes an annular ring of blades 66 and is formed integral with a hub portion 68 which is integral with the outer shaft 36. The outer shaft 36 which extends from the hub portion 34 through the combustion chamber ring to the hub portion 68 thereby forms a unitary structure with the compressor rotor section 20 and the turbine rotor section 58. The outer turbine rotor section 60 also includes an annular ring of blades 70 and extends inwardly therefrom, being formed integral with a hub portion 72. The hub portion 72 defines with the hub portion 68 a chamber 74 which is adapted to receive a hub of the turbine inner rotor to be described hereinafter. Secured to the outer turbine rotor section 60 is an end member 76 which is formed in a hemispherical configuration and acts as a heat deflector for the outer turbine.

The outer turbine rotor sections 58, 60 are formed in a manner similar to that described above in connection with the outer compressor rotor and define therebetween the annular recess 65 in which is positioned an inner turbine rotor 78. The inner turbine rotor 78 has secured thereto an annular ring of blades 80 which are located between the blades 66 and 70 and form therewith a multistage turbine. The inner turbine rotor 78 is formed integral with a hub 84 which in turn is integrally cast or machined as an integral part of the shaft 37. As shown in Fig. 1, the hub 84 is positioned in the chamber 74 defined by the hub portions 68 and 72. By forming the inner turbine rotor 78, the hub 84 and the shaft 37 as an integral unit, the tendency of the hub to become loosened on the shaft at high temperatures and speeds will be prevented. The turbine unit will then be maintained in balance under all operating conditions and the safe operating time of the engine is thereby considerably extended. In order to secure the inner turbine rotor 78 from lateral movement and to provide free rotation of the inner shaft 37 within the outer shaft 36 and hub portion 72, respectively, bearings 86 and 88 are secured in the outer shaft 36 and hub portion 72, respectively. The bearings 86 and 88 are provided with enlarged thrust ends which extend to the chamber 74 and engage the end faces of the inner turbine rotor hub 84 in the manner as described above in connection with thrust portions 51, 52, thereby preventing lateral movement of the inner turbine rotor during rotation of the inner and outer shafts.

In order to mount the outer shaft 36 for rotation in the casing 10, self-aligning bearings 90 and 92 are provided and are positioned in bearing housings 94 and 96, respectively. Referring to Fig. 2, the bearing 90 and housing 94 will be described, it being understood that bearing 92 and housing 96 include similar structure. The bearing housing 94 is formed in two parts which are secured together by bolts extending through holes 97, the bolts thereby keeping the bearing 90 in perfect alignment. The bearing housing 94, as shown, is secured to the casing 10 by bearing supports 98, 99, the supports 98, 99 providing the necessary support for rotatably mounting the compressor and turbine units 16 and 56. Formed in the bearing housing 94 is an annular recess 100 which receives therein an annular oil flange 102 secured to the hub portion 34 and which is provided for forming an oil seal for lubricant supplied to the bearing 90. The bearing 90 in the housing 94 is furthermore formed with a thrust recess 104 which receives an annular thrust flange 106 formed on the shaft 36, the recess 104 and flange 106 being adapted to prevent lateral movement due to thrust exerted along the shaft 36. It is furthermore apparent from the bearing apparatus illustrated and described in connection with the shaft 36 that the shaft 36 will be prevented from lateral movement since the bearing housings 94, 96 are positioned in engagement with the enlarged hub portions 34, 68, respectively.

Since the power plant generates tremendous heat during operation, unless the rotating parts and parts adjacent the combustion chambers 53 are properly cooled, distortion will occur, eventually resulting in the gradual breakdown of the unit. In order to properly cool the critical elements subjected to high temperatures, a cooling system is provided that utilizes atmospheric air.

Enclosing the outer shaft 36 and engaging the inner ends of the bearing housings 94 and 96 is a fixed shaft housing 110. The shaft housing 110 is formed in two identical halves which are bolted together by suitable bolts extending through the bolt holes 112. Coaxially disposed around the shaft housing 110 and spaced therefrom to form a passage 114 is a cylindrical housing 116 which is locked into position between the bearing housings 94, 96. Coaxially positioned around the housing 116 and spaced therefrom is a second cylindrical housing 117 which is also locked into position between the bearing housings 94, 96. Although not illustrated, it is contemplated to insulate the space between the housings 116 and 117 with an insulating material such as asbestos. As shown more clearly in Fig. 2, the bearing supports 98 are formed as an integral member of the housing 10 and have passages 118 formed therein, the passages 118 extending into an annular air intake duct 120 formed by a housing extension 122. The passages 118 communicate with passages 124 that extend through a portion of the bearing housing 94 which communicates with the passage 114, the passages 118 being adapted to conduct cooling air to the passage 114. Referring again to Fig. 1, the exhaust for the cooling air admitted to passage 114 is illustrated and includes passages 126 formed in the bearing supports 99, the passages 126 communicating with the passage 114 through suitable passages formed in the bearing housing 96. An annular exhaust duct 128 is formed in the housing 10 communicating with the passages 126 and is adapted to exhaust the cooling air admitted to the passage 114. When the engine is operating under normal conditions, air will be conducted through the intake duct 120 and conducted by passages 118 to the passage 114. The bearing housings 90, 92 and shaft housing 110, and bearing supports 98 and 99 are thereby cooled, thus increasing the strength and durability of these elements and for all practical purposes eliminating distortion due to heat on the aft end of the turbine shaft and housing.

In order to properly cool the bearing supports and housing prior to the engine reaching its normal operating speed, a cooling by-pass is provided and includes passages 130 formed in the supports 98, the passages 130 communicating with the passage 114 through passages 124. As shown in Figs. 2 and 4, the supports 98 terminate in a shoulder 132 which is provided with a plurality of openings 134, each of the openings 134 communicating with the passages 130. A control plate 135 is rotatably secured around the bearing housing 94 and is formed with a plurality of openings 136 therein which are adapted to communicate with the openings 134. An operating lever 138 is secured to the plate 135 and may be manually or automatically controlled, as desired. When the engine is started or is idling, cooling air will be introduced into the passages 130 by the compressor unit 16, the control plate 135 having been rotated to register the openings 134 and 136. After the engine has reached normal operating speed, the control plate is actuated to move the openings 136 out of register with the openings 134, thereby closing the by-pass to the cooling passages. The cooling air is then received through duct 120 and passages 118 as discussed above.

The bearings for the inner and outer shafts 36, 37 are adapted to be lubricated at all times and for this purpose reduced portion 38 of the inner shaft 37 is provided with an inlet conduit 140 which receives lubricating oil under pressure from a suitable source. The conduit 140 is also operatively connected to a starter motor and thereby serves as a starter shaft. In describing the lubricating system, reference is made to Figs. 2 and 3 which illustrate the compressor bearing arrangement. However, it is understood that the lubrication system for the turbine is constructed similarly. Extending through the interior of the reduced portion 38 of the shaft 37 and the shaft 37 proper is a central passage 142 which is provided for distributing the lubricating oil to the shaft bearings. Communicating with the central passage 142 are a plurality of radially extending oil passages 144 which extend into the inner shaft bearings 48, 50 and 90. In order to circulate the lubricating oil, thereby providing for continual use thereof, the central hub 41 is formed with annular recesses 146 which communicate with diagonally extending passages 148 also formed in the hub 41, the passages 148 conducting the lubricating oil to an annular space 150 formed in the thrust portion 52 of the bearing 50 and to an annular recess 152 formed in the hub 41. An annular space 154 communicates with the recess 152 and is adapted to receive the lubricating oil from the passages 148. Since the hub 41 is rotating at all times when the lubrication system is in operation, a vacuum is created at the corners of the hub, thereby obviating the need of oil seals around the hub. In operation, rotation of the hub 41 causes the diagonal passages 148 to effect a pumping action, which pumping action rapidly circulates the lubricating oil through the hub to the annular space 154. The space 154 communicates with a passage (not shown) which returns the oil to the point of origin for recirculation. The lubricating oil conducted to the bearing 90 is recirculated through the passage formed between the shaft 35 and the housing 110 and is received by a conduit 156. The conduit 156 then conveys the oil back to the point of origin through a passage (not shown).

In order to properly deflect the incoming air to the compressor 16, deflectors 160 are provided in the inlet 12, being secured to the housing 10. Additional deflectors 162 are secured adjacent the exhaust end of the compressor and provide for an even distribution of the compressed air to the combustion chambers.

In order to deflect the combustion products into the turbine, deflectors 164 are secured adjacent thereto and exhaust deflectors 166 are provided for directing the exhaust gases to the outlet nozzle of the engine.

In operation, the jet engine is initially started by a convenient starting motor operatively secured to the outer shaft 140. The outer compressor rotor and the inner compressor rotor are rotated in opposite directions since the blade rings of each rotor are formed with oppositely pitched blades. As the air is delivered under pressure to the combustion chambers 53, it is mixed with the fuel injected therein, and the resulting combustion products are propelled downstream into the turbine unit 56. The outer turbine rotor which is connected to the outer compressor rotor through the common shaft 36 is thus adapted to cause rotation of the outer compressor rotor. The inner turbine rotor 78, which rotates oppositely to the outer turbine rotor and is secured to the inner shaft 37, then rotates the inner compressor rotor 38 which is also secured to the inner shaft 37. It is apparent, therefore, that the outer compressor rotor and outer turbine rotor rotate as a unit in one direction, while the inner compressor rotor and inner turbine rotor rotate as a unit in the opposite direction, both units operating at the same speed due to the positioning of the inner rotor within the outer rotor.

The reversely rotating rotors are constructed such that they are of the same size and weight and are rotated at the same speed. Thus, the outer compressor rotor and outer turbine rotor, which are equal in weight and size to the inner compressor rotor and inner turbine rotor, when rotated in opposite directions, counteract the centrifugal forces which would normally be present in single rotor engines, and thereby eliminate any gyro action that would tend to be present. The inner rotors of both the compressor and turbine are so positioned within the outer rotors that a compact multistage compressor and turbine are formed. It is apparent from the construction described that the entire outer compressor turbine unit is formed in three individual sections that may be conveniently disassembled from the inner rotors whenever necessary. In disassembling the units, the outer compressor section 22 is first removed from engagement with the section 20. After the spanner nut 44 has been removed from the shaft 37, the inner compressor rotor 39 is then removed from the tapered portion 42 of the shaft 37, thereby enabling the outer compressor section 20, shaft 36, including the hub portions 34 and 68, and the outer turbine section 58 to be removed as a unit.

Since the turbine rotor operates at a relatively high speed, balancing of the turbine and compressor rotors is oftentimes required. As described above, the rotors are constructed in such a manner that they are assembled separately and therefore they may be accurately and scientifically balanced one apart from the other.

By use of the above-described reversely rotating rotors, which may also be employed in gas turbines or turbine compressor units, the air pressures are considerably raised on the output side of the compressor unit, thereby enabling air under higher pressures to be admitted to the combustion chambers. This provides quicker starting and enables leaner fuel mixtures to be employed, thereby resulting in less fuel consumption. The reversely rotating rotors furthermore eliminate gyro action and reduce the centrifugal forces normally present in single rotor engines and thereby reduce wear on the bearings. Moreover, by employing the recirculating lubricating system described herein, the bearings are continuously and effectively lubricated, while the cooling system for the shafts and bearing supports prevents distortion of the engine operating parts.

Because of the opposed action of the contra-rotating units and inasmuch as these units are housed in a compact manner, the horsepower rating weight ratio is considerably increased over those engines known heretofore. Thus, a high output of the engine is maintained with a corresponding decrease in weight. Furthermore, due to the opposed action of the turbo compressor units, the turbo compressor rotors will rotate at approximately half the speed of the present-day engines, but will maintain the same output. By reducing the speed of the engine but maintaining the required output, centrifugal forces are reduced, thereby eliminating the tendency of the rotors to fail because of excessive rim pressures. Other advantages of the present invention are: longer life of engine because of slower running parts; a more compact engine thereby requiring less space; a safer engine because of slower speeds of moving parts; and easy and accurate balancing of the compressor and turbine rotors.

It will be obvious to those skilled in the art that various changes may be made without departing from the spirit of the invention and, therefore, the invention is not limited to what is shown in the drawings and described in the specification, but only as indicated in the appended claims.

What is claimed is:

1. A turbo-compressor system comprising a first hollow outer shaft, an inner shaft journaled for rotation in said outer shaft, an outer compressor rotor formed in two sections, one section being formed integral with said hollow shaft, a second hollow outer shaft formed integral with the other of said outer compressor rotor sections and receiving an end of said inner shaft therein, an outer turbine rotor formed in two sections, one section being formed integral with said first hollow outer shaft, a third hollow outer shaft formed integral with the other of said outer turbine sections and receiving an end of said inner shaft therein, said outer compressor rotor, said outer turbine rotor and said hollow shafts forming a combined unit for rotation together, an inner compressor rotor secured to said inner shaft and an inner turbine rotor secured to said inner shaft, said inner turbine, said compressor rotor, and said inner shaft forming a combined unit for rotation together in the direction opposite to the outer shafts and rotors.

2. A turbo-compressor system as set forth in claim 1, including a cooling system for cooling said shafts, said cooling system comprising idling cooling means for cooling said shafts when said aircraft is idling, and additional means for cooling said shafts when said aircraft is moving at high speeds.

3. A turbo-compressor system as set forth in claim 2, wherein said cooling system includes control means, said control means being actuated in accordance with the speed of said compressor to select either said idling cooling means or said additional cooling means for cooling said shafts.

4. A turbo-compressor system as set forth in claim 1, wherein said outer compressor rotor, said outer turbine rotor, and said outer shafts are formed of the same size and weight and rotate at the same speed as said inner compressor rotor, said inner turbine rotor and said inner shaft, thereby reducing centrifugal forces and eliminating gyro effect.

5. A turbo-compressor system as set forth in claim 1, including bearing assemblies positioned between said compressor and turbine and receiving said first hollow outer shaft for rotation therein.

6. A turbo-compressor system as set forth in claim 1, including means for lubricating said bearings, said lubricating means including a central passage formed in said inner shaft, radially extending passages formed in said inner shaft and said outer shafts, said radially extending passages communicating with said central passage and distributing lubricating oil to said bearings, and diagonally extending passages formed in said inner compressor and turbine rotors, said diagonally extending passages providing a pumping action for rapidly circulating the lubricating oil.

7. In a turbo-compressor unit, an inner shaft, an outer shaft coaxial with said inner shaft and rotating oppositely thereto, bearing means for rotatably supporting said inner and outer shafts, said bearing means including combination thrust and radial bearings, means for lubricating said bearings and means for cooling said lubricating means, said lubricating means including a central passage formed in said inner shaft and communicating with said bearings for conducting lubricating oil thereto, said cooling means including an air inlet passage for conducting atmospheric air into an annular passage formed around said outer shaft, and extending from one of the outer shaft bearings to the other, said air cooling said lubricating oil and said outer shaft during the movement thereof through said annular passage, said cooling air being exhausted to atmosphere adjacent the turbine and exteriorly of the compressor turbine gas stream.

References Cited in the file of this patent
UNITED STATES PATENTS

| | | |
|---|---|---|
| 2,134,334 | Jones | Oct. 25, 1938 |
| 2,439,273 | Silvester | Apr. 6, 1948 |
| 2,472,878 | Baumann | June 14, 1949 |
| 2,505,660 | Baumann | Apr. 25, 1950 |
| 2,563,270 | Price | Aug. 7, 1951 |
| 2,625,013 | Howard et al. | Jan. 13, 1953 |
| 2,625,790 | Petrie | Jan. 20, 1953 |
| 2,625,794 | Williams et al. | Jan. 20, 1953 |
| 2,639,579 | Willgoos | May 26, 1953 |
| 2,672,013 | Lundquist | Mar. 16, 1954 |
| 2,702,985 | Howell | Mar. 1, 1955 |

FOREIGN PATENTS

| | | |
|---|---|---|
| 586,555 | Great Britain | Mar. 24, 1947 |